Sept. 29, 1970  R. B. DIEHL  3,531,193
TRANSPARENCY HOLDER FOR OVERHEAD PROJECTIONS
Filed Aug. 11, 1967  2 Sheets-Sheet 1
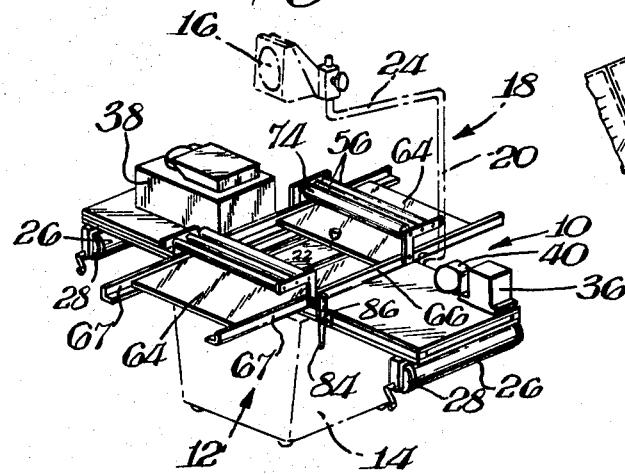
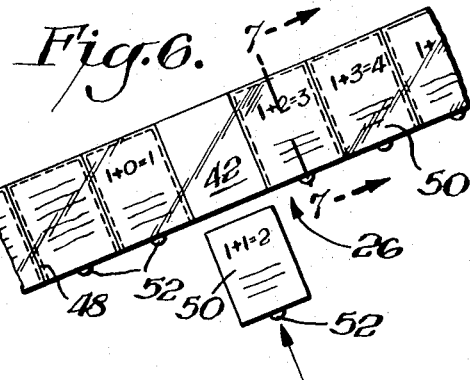
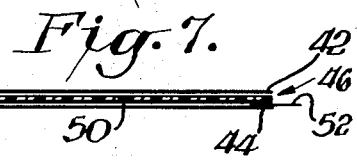
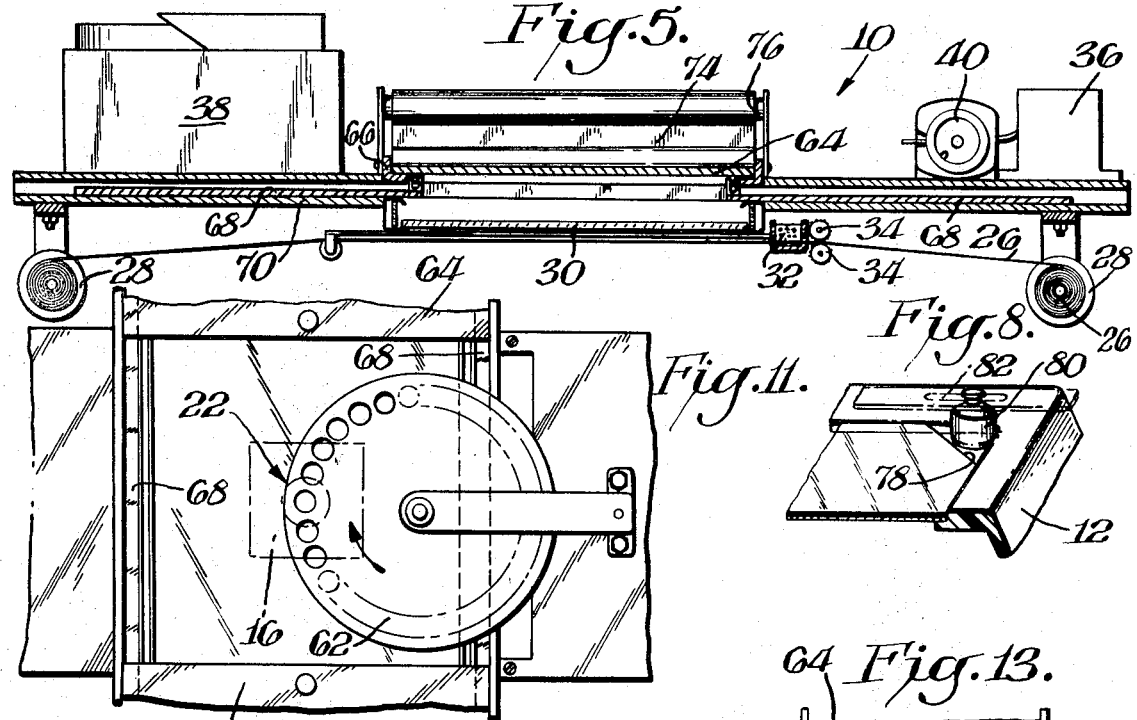
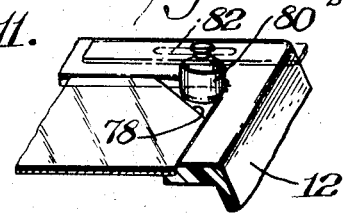
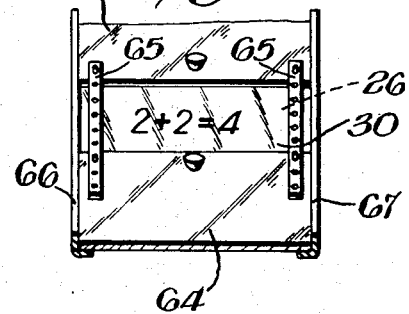
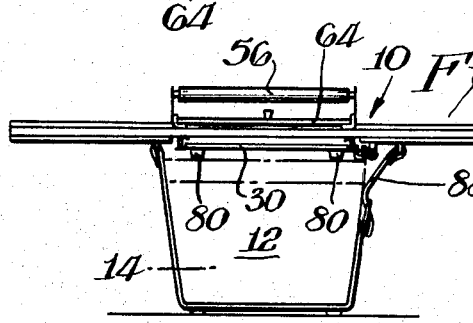

Sept. 29, 1970     R. B. DIEHL     3,531,193
TRANSPARENCY HOLDER FOR OVERHEAD PROJECTIONS
Filed Aug. 11, 1967     2 Sheets-Sheet 2
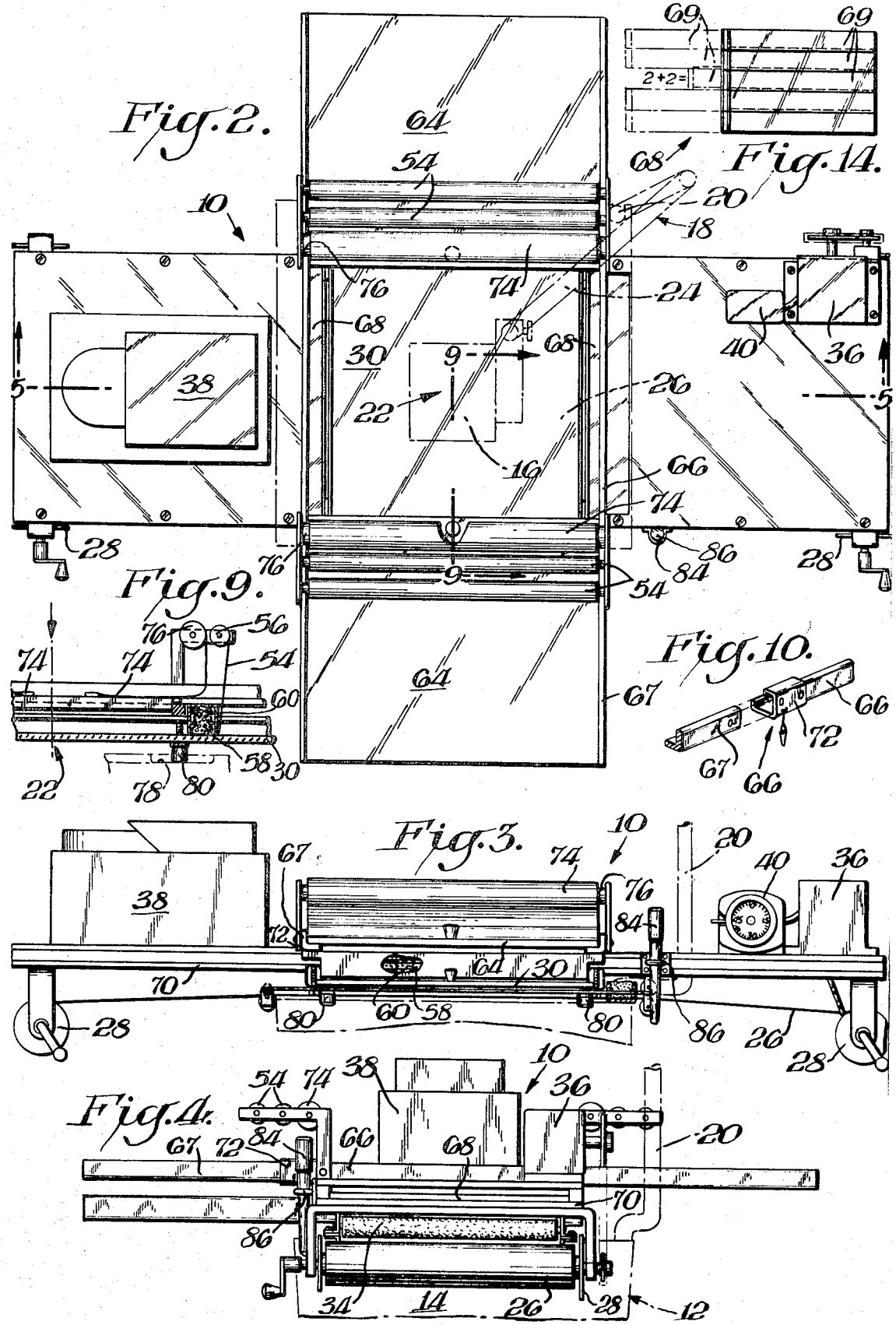

United States Patent Office 3,531,193
Patented Sept. 29, 1970

3,531,193
TRANSPARENCY HOLDER FOR OVERHEAD PROJECTIONS
Robert B. Diehl, 242 Potomac Road,
Fairfax, Wilmington, Del. 19803
Filed Aug. 11, 1967, Ser. No. 659,979
Int. Cl. G03b 21/14
U.S. Cl. 352—87                                    12 Claims

ABSTRACT OF THE DISCLOSURE

A transparency holder includes components such as rollers for moving a transparency into and out of the projection area with cleaning apparatus provided to clean the transparency as it is moved out of the projection area and with a masking device provided to control the effective size of the projection area. The transparency itself may be in the form of individual cards and an elongated transparent casing which includes a plurality of compartments for removably housing the individual cards and with the casing being capable of being marked without deforming or tearing.

BACKGROUND OF THE INVENTION

With the growing use of overhead projectors there is a correspondingly growing need for effective transparency holders to enhance the versatility of the overhead projector and to free the operator for other duties attendant with use of the projector. Such a need is particularly strong in the educational field to free the teacher from menial manipulations of the overhead projector or transparency.

SUMMARY OF THE INVENTION

An object of this invention is to provide a transparency holder which is versatile in operation and which requires minimum attention for its operation.

A further object is to provide a transparent casing which may removably house pluralities of individual transparent cards and which may in itself be capable of functioning as a transparency.

A still further object of this invention is to provide a transparency holder which automatically accomplishes a plurality of functions heretofore done in a manual manner.

In accordance with this invention a transparency holder is provided which includes means for moving the transparency into and out of the projection area, which includes means for automatically cleaning the transparency upon movement from the projection area, and also includes masking means to control the effective size of the projection area. The transparency holder may include for example a transparent shield in the projection area which is capable of being marked and which covers an elongated transparency movably mounted upon rollers. The cleaning means may be in the form of, for example, a sponge positioned to remove the markings from the shield when the shield is slid out of the projection area.

A particularly advantageous feature may be the provision of an elongated heavy gauge transparent film formed with a plurality of pockets or compartments to house individual transparent cards or transparencies and, because of its heavy gauge, may be capable of acting as a transparency itself by being marked without tearing or otherwise deforming.

The masking means for the transparency holder may take a number of advantageous forms. For example it may consist of two pairs of plates which are slidable into and out of the projection area. One pair of plates may be mounted upon detachable legs or tracks to provide a more compact unit. In such a case the other pair of plates may be segmented with individual sliding segments, or the removed plates may be replaced by curtain type devices mounted upon rollers. The plates in each pair may be interlocked for joint movement to maintain the distance between them constant.

In a further form of this invention the transparency movement may be motorized and a recorder may be utilized in combination therewith to provide sound to accompany the transparency. The movement of the transparency and the actuation of the recorder may be controlled by a timer for synchronous operation.

THE DRAWINGS

FIG. 1 is a perspective view of a transparency holder in accordance with this invention and shown in combination with a recorder;

FIG. 2 is a plan view of the transparency holder shown in FIG. 1;

FIGS. 3 and 4 are side and end elevation views respectively of the transparency holder shown in FIGS. 1 and 2;

FIG. 5 is a cross-sectional view through FIG. 2 along the line 5—5;

FIG. 6 is a plan view of a transparent housing or casing with individual cards therein in accordance with another aspect of this invention;

FIG. 7 is a cross-sectional view through FIG. 6 along the line 7—7;

FIG. 8 is a fragmentary view partially in section of a portion of the transparency holder shown in FIGS. 1–5;

FIG. 9 is a cross-sectional view through FIG. 2 along the line 9—9;

FIG. 10 is a perspective view of a portion of a modified transparency holder in accordance with this invention;

FIG. 11 is a plan view of a portion of still another form of a transparency holder in accordance with this invention;

FIG. 12 is an elevational view of a transparency holder mounted upon an overhead projector in accordance with this invention;

FIG. 13 is a plan view of a portion of a further embodiment of a transparency holder in accordance with this invention; and FIG. 14 is a plan view of a portion of still another transparency holder in accordance with this invention.

DETAILED DESCRIPTION

As shown in FIG. 1 the transparency holder 10 is mounted upon a generally conventional overhead projector 12 which includes the light housing 14 and the lens housing 16. The lens housing 16 is attached to light housing 14 by means of a connecting arm 18. Arm 18 is particularly designed to be used with the transparency holder of this invention in that it includes a generally vertical section 20 which is normal to the projection area 22 and extends well above the projection area but to the side thereof. A horizontal section or arm 24 is connected to vertical arm 20 and is disposed for holding the lens housing 16 directly above the projection area 22.

As shown in FIG. 5 the transparency 26 is mounted upon rollers 28 for movement through the projection area 22. A protective transparent shield 30 made for example of glass or a suitable plastic covers the transparency 26 in the projection area. Frequently, as later discussed with regard to FIGS. 6–7, the transparency 26 contains removable markings on its upper surface. These markings are automatically removed by a cleaning device such as a damp or chemically treated sponge 32 which contacts the upper surface of the transparency 26 as the transparency is moved in a forward direction out of or downstream from the projection area. Where liquid means are employed to remove the markings, drying rollers such as felt rollers 34 are provided downstream from the cleaning device 32.

The movement of the transparency 26 may advantageously be controlled for automatic operation by a motor 36 which drives the rollers 28. Additionally to complete the automatic use of the device a conventional recorder 38 may also be used in combination with holder 10 by being mounted upon the transparency holder 10 to provide a voice corresponding to the particular transparency being projected. Both the motor 36 and recorder 38 may be interconnected by conventional electrical circuitry which includes timer 40 so that the transparency movement and recorder 38 operate in synchronization.

FIGS. 6–7 show a particularly advantageous form of transparency 26. As indicated therein the transparency 26 comprises an elongated film or casing having an upper layer 42 and a lower layer 44 which are joined together along three sides and open on their fourth common side 46. A plurality of pockets or compartments are formed in the layers by means of seams 48. Each compartment may removably house individual transparencies or transparent cards 50 having tabs 52 to facilitate their removal from the pockets. Additionally the transparency housing or casing itself which may be made for example of relatively heavy gauge Mylar, is capable of acting as a transparency in that it can be marked without tearing or otherwise deforming. This form of the transparency is of itself worthy of special note.

In addition to the main transparency 26, other transparencies such as 54 (FIGS. 2 and 9) may be provided. Although two such transparencies are illustrated in FIG. 2 and one in FIG. 9 any desired number may be used. These supplemental transparencies are particularly useful for superimposing over the main transparency 26 to add color variation or other variations to the projected image. The transparency 54 is also mounted on rollers 56 which may be motorized if desired. As indicated in FIG. 9 a further cleaning device 58 is provided to remove any markings from the superimposed transparency 54 as these transparencies are moved out of the projection area 22. When a sponge or other comparable cleaning device is used, a rod 60 is mounted over the device 58 to not only maintain the device 58 in its proper position but also to apply pressure to the device 58 for aiding its cleaning action by assuring intimate contact of the device 58 with transparency 54 or as later described with shield 30.

To further add to the versatility of transparency holder 10, shield 30 is mounted for slidable movement into and out of the area 22. Thus shield 30 may be marked to add variations to the projected image. In such a case when supplemental transparencies are not used the markings are automatically removed from shield 30 (FIG. 9) by the cleaning device 58 as the shield is slid out of the projection area 22. Although not illustrated drying rollers similar to rollers 34 may also be provided in conjunction with cleaning device 58.

FIG. 11 shows still another feature of this invention which adds to the versatility of the projected image. As illustrated therein a rotatable disc 62 is mounted between the lens housing 16 and projection area 22. Disc 62 serves two primary functions. The disc may contain a series of transparent pictures which upon rotation of the disc creates the illusion of motion with respect to the projected image in a manner similar to cartoons. Additionally the disc by reason of its location serves the function of providing vertical blackening or masking.

The type of image projected is further controlled by the masking features of this invention. As shown in FIGS. 2 and 3 a pair of plates 64 are slidable in tracks 66 into and out of projection area 22. Beneath these plates are a second pair of plates 68 which likewise slide in tracks 70 into and out of the projection area. By proper positioning of the plates 64 and 66 the effective size of the projection area may be controlled through the masking effect of the plates. Where the available space is limited guide rails 66 may be detached and plates 64 removed. For example as shown in FIG. 10 guide rails 66 may terminate in removable extension 67 which may be secured to the main portions of track 66 by suitable locking devices 72.

When plates 64 are removed, the masking effect may be obtained in a manner shown for example in FIGS. 2 and 9. As illustrated therein a pair of opaque curtains 74 are mounted upon rollers 76 and can be moved into and out of projection area 22.

FIG. 14 shows a particularly advantageous form of the masking means when only one pair of plates are used. As illustrated therein plates 68 are made in a plurality of segments 69 which are interlocked by, for example tongue and groove arrangements so that the individual segments 69 can move independently of each other. In this manner the type of masking which would be achieved by plates 64 is possible as well as permitting the selective masking of discrete portions of projection area 22 which is particularly desirable in illustrating, for example questions and then answers. The segmented plates 68 thus provide for a finer degree of control of the masking.

FIG. 13 illustrates an advantageous embodiment of this invention wherein a pair of plates such as plates 64 are interlocked by means of adjustable connectors 65 to maintain the distance between the plates 64, 64 constant and to thereby permit the joint movement of the plates. Since connectors 65 are adjustable, the distance between the plates 64, 64 can be correspondingly changed.

Holder 10 may be made of a size to be mounted upon standard overhead projectors. In this respect such projectors generally include webbed indented corners 78 (FIGS. 8 and 9) at the projection area. Holder 10 is provided with feet 80 for mounting upon each of these webbed corners. In the event that the dimensions of a particular overhead projector should vary, the feet 80 are made movable as for example by a groove-slot arrangement 82 so that the distance between the various feet 80 can be varied. To further secure the transparency holder 10 to the overhead projector 12, suitable fastening device such as belt 88 (FIG. 12), are provided.

Holder 10 may also include various storage facilities for items such as markers, books, etc., which are generally used in conjunction with the overhead projector. For example as illustrated in FIGS. 1–3 a marking device 84 may be held in clip 86 along the edge of guide rails 70.

Obviously many modifications and variations of this invention are possible in light of the above teachings. It is, therefore, to be understood that within the scope of the appended claims this invention may be practiced otherwise than as specifically described.

What is claimed is:

1. A transparency holder for overhead projectors comprising a projection area, means for moving a transparency in a foward direction into and out of said projection area; and means downstream from said projection area for cleaning the transparency upon movement out of said projection area whereby the movement of the transparency out of said projection area may automatically result in the removal of markings which had been applied to the transparency.

2. A transparency holder as set forth in claim 1 wherein said means for moving the transparency includes roller means for moving a transparency into and out of said projection area, and a transparent shield being in said projection area above the transparency, said shield being movable into and out of said projection area and being adapted to having markings on its upper surface, said cleaning means being disposed in the line of travel of said shield to remove the markings therefrom.

3. A transparency holder as set forth in claim 2 wherein the transparency includes a plurality of individual transparent cards having markings thereon, and a transparent flexible film-like casing having a plurality of compartments removably housing said individual cards.

4. A transparency holder as set forth in claim 3 including at least one set of rollers for moving at least one superimposed layer of transparencies over said casing in a direction transverse to the direction of movement of said casing, and said cleaning means being further disposed in the line of travel of each superimposed layer.

5. A transparency holder as set forth in claim 2 including drying rollers downstream from said cleaning means, and pressure means reacting against said cleaning means.

6. A transparency holder as set forth in claim 2 including a rotatable slotted disc disposed above said projection area.

7. A transparency holder as set forth in claim 1 wherein masking means are provided for controlling the effective size of said projection area, said masking means including two pairs of opposed plates slidable into and out of said projection area.

8. A transparency holder as set forth in claim 1 wherein masking means are provided for controlling the effective size of said projection area, said masking means including a pair of plates slidable into and out of said projection area, and at least one of said plates being segmented into individually movable segments.

9. A transparency holder as set forth in claim 1 wherein masking means are provided for controlling the effective size of said projection area, said masking means including two pair of track means for supporting two pair of opposed slidable plates, one of said pair of track means being detachable, a pair of slidable plates in the other of said pair of track means, roller means disposed adjacent said detachable track means, and curtain means on said roller means movable into and out of said projection area.

10. A transparency holder as set forth in claim 7 including interlocking means for maintaining a predetermined distance between the plates in at least one pair of said plates whereby said plates are jointly movable.

11. A transparency holder as set forth in claim 7 including a support frame for said transparency moving means and said masking means, support legs under said frame, and the distance between said legs being adjustable to accommodate different size overhead projectors.

12. A transparency holder as set forth in claim 11 in combination therewith an overhead projector, securing means attaching said holder to said projector, said projector having a vertical arm normal to said projection area and extending above and to the side of said projection area, a horizontal arm connected to said vertical arm and being disposed directly over said projection area, motor means and timer means for actuating said transparency moving means, recorder means for operation in synchronization with said transparency moving means, and storage means on said support frame.

References Cited
UNITED STATES PATENTS

| | | | |
|---|---|---|---|
| 960,519 | 6/1910 | Dutton | 352—96 |
| 1,997,124 | 4/1935 | Soman | 353—130 |
| 2,149,779 | 3/1939 | Kroner. | |
| 2,330,799 | 10/1943 | Coker et al. | 353—45 |
| 3,003,394 | 10/1961 | Figaretti | 353—44 |
| 3,169,332 | 2/1965 | Rosenburgh. | |
| 3,264,936 | 8/1966 | Schultz et al. | |
| 3,362,286 | 1/1968 | Webb et al. | 353—45 |
| 2,334,329 | 11/1943 | Isaacson. | |
| 2,669,156 | 2/1954 | Fitzgerald. | |
| 3,320,854 | 5/1967 | Wally. | |

NORTON ANSHER, Primary Examiner

M. H. HAYES, Assistant Examiner

U.S. Cl. X.R.

352—38, 96, 130, 244; 353—97